(12) United States Patent
Capper et al.

(10) Patent No.: US 9,225,626 B2
(45) Date of Patent: Dec. 29, 2015

(54) SYSTEM AND METHOD FOR PROVIDING VIRTUAL MULTIPLE LINES IN A COMMUNICATIONS SYSTEM

(75) Inventors: Simon Capper, Sunnyvale, CA (US); Jeff Peck, Los Altos, CA (US); Dennis Peng, Mountain View, CA (US)

(73) Assignee: Ooma, Inc., Palo Alto, CA (US)

( * ) Notice: Subject to any disclaimer, the term of this patent is extended or adjusted under 35 U.S.C. 154(b) by 952 days.

(21) Appl. No.: 12/214,756

(22) Filed: Jun. 20, 2008

(65) Prior Publication Data

US 2008/0316946 A1 Dec. 25, 2008

Related U.S. Application Data

(60) Provisional application No. 60/936,584, filed on Jun. 20, 2007.

(51) Int. Cl.
*H04L 12/701* (2013.01)
*H04L 12/707* (2013.01)
*H04M 7/00* (2006.01)

(52) U.S. Cl.
CPC ............... *H04L 45/00* (2013.01); *H04L 45/22* (2013.01); *H04M 7/0057* (2013.01)

(58) Field of Classification Search
None
See application file for complete search history.

(56) References Cited

U.S. PATENT DOCUMENTS

| | | | |
|---|---|---|---|
| 5,425,085 A | 6/1995 | Weinberger et al. | |
| 5,519,769 A | 5/1996 | Weinberger et al. | |
| 5,796,736 A | 8/1998 | Suzuki | |
| 6,023,724 A | 2/2000 | Bhatia et al. | |
| 6,377,938 B1 | 4/2002 | Block et al. | |
| 6,487,197 B1 | 11/2002 | Elliott | |
| 6,615,264 B1 | 9/2003 | Stoltz et al. | |
| 6,697,358 B2 | 2/2004 | Bernstein | |
| 6,714,545 B1 | 3/2004 | Hugenberg et al. | |
| 6,778,528 B1 | 8/2004 | Blair et al. | |
| 6,934,258 B1 * | 8/2005 | Smith et al. | 370/238 |
| 7,124,506 B2 | 10/2006 | Yamanashi et al. | |
| 7,127,043 B2 | 10/2006 | Morris | |
| 7,127,506 B1 | 10/2006 | Schmidt et al. | |

(Continued)

FOREIGN PATENT DOCUMENTS

WO  WO2015041738  3/2015

OTHER PUBLICATIONS

International Search Report and Written Opinion mailed Nov. 7, 2014 for App. No. PCT/US2014/44945, filed Jun. 30, 2014.

(Continued)

*Primary Examiner* — Chirag Shah
*Assistant Examiner* — Amar Persaud
(74) *Attorney, Agent, or Firm* — Carr & Ferrell LLP (57) ABSTRACT

An exemplary system and method for providing virtual multiple lines in a communication system is provided. The exemplary system allows a plurality of simultaneous phone calls to be conducted via a single access identifier (e.g., phone number). In exemplary embodiments, the system comprises a hub configured to route calls via PSTN and VoIP. The determination as to how the call should be routed may be performed by the hub, a call services server, or a combination of both. At least one client device may be coupled in communication with the hub and configured to enable placement or receipt of a second or subsequent call when a first call is active. The client device is coupled to a communication device which places or receives the second or subsequent call.

22 Claims, 6 Drawing Sheets

(56) References Cited

U.S. PATENT DOCUMENTS

| | | |
|---|---|---|
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 8,331,547 B2 | 12/2012 | Smith et al. |
| 8,515,021 B2 | 8/2013 | Farrand et al. |
| 2001/0053194 A1* | 12/2001 | Johnson ............... H04B 7/2693 375/356 |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0085692 A1 | 7/2002 | Katz |
| 2002/0165966 A1 | 11/2002 | Widegren et al. |
| 2003/0058844 A1* | 3/2003 | Sojka et al. ................... 370/352 |
| 2003/0099334 A1 | 5/2003 | Contractor |
| 2003/0184436 A1 | 10/2003 | Seales et al. |
| 2003/0189928 A1 | 10/2003 | Xiong |
| 2004/0010472 A1 | 1/2004 | Hilby et al. |
| 2004/0010569 A1 | 1/2004 | Thomas et al. |
| 2004/0059821 A1 | 3/2004 | Tang et al. |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2005/0027887 A1* | 2/2005 | Zimler et al. ................. 709/249 |
| 2005/0036590 A1 | 2/2005 | Pearson et al. |
| 2005/0074114 A1 | 4/2005 | Fotta et al. |
| 2005/0078681 A1 | 4/2005 | Sanuki et al. |
| 2005/0089018 A1 | 4/2005 | Schessel |
| 2005/0097222 A1 | 5/2005 | Jiang et al. |
| 2005/0105708 A1* | 5/2005 | Kouchri et al. ............... 379/219 |
| 2005/0141485 A1* | 6/2005 | Miyajima et al. ............. 370/352 |
| 2005/0169247 A1 | 8/2005 | Chen |
| 2005/0238034 A1 | 10/2005 | Gillespie et al. |
| 2005/0259637 A1 | 11/2005 | Chu et al. |
| 2006/0007915 A1 | 1/2006 | Frame |
| 2006/0009240 A1 | 1/2006 | Katz |
| 2006/0013195 A1 | 1/2006 | Son et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0251048 A1* | 11/2006 | Yoshino et al. ............... 370/351 |
| 2006/0258341 A1 | 11/2006 | Miller et al. |
| 2006/0259767 A1 | 11/2006 | Mansz et al. |
| 2007/0036314 A1 | 2/2007 | Kloberdans et al. |
| 2007/0037560 A1 | 2/2007 | Yun et al. |
| 2007/0054645 A1 | 3/2007 | Pan |
| 2007/0061735 A1 | 3/2007 | Hoffberg et al. |
| 2007/0071212 A1 | 3/2007 | Quittek et al. |
| 2007/0121593 A1 | 5/2007 | Vance et al. |
| 2007/0121596 A1 | 5/2007 | Kurapati et al. |
| 2007/0133757 A1* | 6/2007 | Girouard et al. ............. 379/67.1 |
| 2007/0153776 A1* | 7/2007 | Joseph et al. ................. 370/356 |
| 2007/0183407 A1* | 8/2007 | Bennett et al. ................ 370/352 |
| 2007/0203999 A1 | 8/2007 | Townsley et al. |
| 2007/0283430 A1 | 12/2007 | Lai et al. |
| 2007/0298772 A1 | 12/2007 | Owens et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0097819 A1 | 4/2008 | Whitman |
| 2008/0111765 A1 | 5/2008 | Kim |
| 2008/0125095 A1 | 5/2008 | Mornhineway et al. |
| 2008/0144625 A1 | 6/2008 | Wu et al. |
| 2008/0159515 A1 | 7/2008 | Rines |
| 2008/0168145 A1 | 7/2008 | Wilson |
| 2008/0196099 A1 | 8/2008 | Shastri |
| 2008/0225749 A1 | 9/2008 | Peng et al. |
| 2008/0247401 A1* | 10/2008 | Bhal et al. .................... 370/401 |
| 2008/0298348 A1 | 12/2008 | Frame et al. |
| 2008/0313297 A1* | 12/2008 | Heron et al. .................. 709/207 |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0213999 A1 | 8/2009 | Farrand et al. |
| 2009/0253428 A1 | 10/2009 | Bhatia et al. |
| 2010/0046530 A1 | 2/2010 | Hautakorpi et al. |
| 2010/0046731 A1* | 2/2010 | Gisby et al. ................... 370/352 |
| 2010/0098235 A1* | 4/2010 | Cadiz et al. ............... 379/211.02 |
| 2010/0114896 A1* | 5/2010 | Clark et al. ................... 707/741 |
| 2010/0136982 A1* | 6/2010 | Zabawskyj et al. ........... 455/445 |
| 2011/0170680 A1 | 7/2011 | Chislett et al. |
| 2011/0183652 A1 | 7/2011 | Eng et al. |
| 2012/0027191 A1 | 2/2012 | Baril et al. |
| 2012/0036576 A1 | 2/2012 | Iyer |
| 2012/0099716 A1 | 4/2012 | Rae et al. |
| 2012/0284778 A1 | 11/2012 | Chiou et al. |
| 2013/0293368 A1 | 11/2013 | Ottah et al. |
| 2013/0336174 A1 | 12/2013 | Rubin et al. |
| 2015/0086001 A1 | 3/2015 | Farrand et al. |
| 2015/0087280 A1 | 3/2015 | Farrand et al. |

OTHER PUBLICATIONS

International Search Report and Written Opinion mailed Jul. 27, 2015 for App. No. PCT/US2015/029109, filed May 4, 2015.

* cited by examiner

SYSTEM AND METHOD FOR PROVIDING VIRTUAL MULTIPLE LINES IN A COMMUNICATIONS SYSTEM

CROSS-REFERENCE TO RELATED APPLICATIONS

The present application claims priority benefit of U.S. Provisional Patent Application No. 60/936,584, filed Jun. 20, 2007, entitled "Virtual Multiple Lines in a VoIP System," which is hereby incorporated by reference.

BACKGROUND

1. Field of the Invention

Embodiments of the present invention relate generally to Voice over Internet Protocol (VoIP) technology, and more particular to implementation of virtual multiple lines in a communication system.

2. Description of Background Art

In a public switched telephone network (PSTN), an initiating phone connects to a circuit switch and the PSTN via a first plain old telephone service (POTS) line. Similarly, a destination phone connects to the circuit switch and the PSTN via a second POTS line. As such, the circuit switch electrically connects the initiating phone to the destination phone over the PSTN. The electrical connection is maintained for an entire duration of a phone call between the initiating phone and the destination phone. This electrical connection in the PSTN is commonly referred to as "circuit switched." However, a problem with the PSTN is that because much of a conversation is silence, maintaining the electrical connection for the duration of the phone call wastes available bandwidth in the circuit switch.

A POTS line can only carry one active phone call at a time. An active call is a call where the parties active in the call can communicate. To be able to place additional phone calls using the same phone number allocated to the first POTS line the PSTN provider must install additional POTS lines at the customer premises.

Voice over Internet Protocol (VoIP) is a technology that permits phone calls to be carried over the Internet as opposed to over the PSTN. In VoIP, a device known as an analog telephone adapter (ATA) or media gateway serves as an interface between an analog phone and the packet-based Internet. In operation, an initiating ATA converts analog signals from an initiating phone into packets using a voice codec. To receive an incoming call at the destination phone, a destination ATA receives packets into a buffer and uses the same codec to convert the packets back into analog signals. The ATA may be a stand-alone device or may be incorporated into another device such as a cordless phone base station or broadband modem.

Conventionally, ATAs provide VoIP functionality via a connection to a broadband modem, such as through a cable modem or a digital subscriber line (DSL) connection to the Internet. Broadband refers to communications in which multiple messages or channels may be carried simultaneously over the same transmission medium. A broadband network is any network capable of providing broadband services (e.g., a network supporting digital traffic). VoIP services are generally provided through an Internet Telephony Service Provider (ITSP). In many instances, the ITSP strives to emulate the behavior and reliability of the PSTN while offering a lower cost for delivering the service and/or increased functionality.

For many VoIP services offered for residential use, a single ATA is provided which delivers the VoIP services. As such, there is a limited ability to offer VoIP services to multiple phones in the residence. Instead, the user may be encouraged to connect a multi-station cordless phone system to the FXS port of the ATA so that the benefits of the VoIP service can be enjoyed on multiple phones in the residence. This approach, however, carries with it many limitations. For example, such cordless phone systems require AC power, which results in the phone system ceasing to function in an event of a power outage. Another disadvantage with using a single ATA is that a user may lose use of existing phones since the ATA only provides a single FXS port located at just one location in the home. Furthermore, audio quality of most cordless systems is lower than wired telephone systems. Yet another disadvantage is that cordless handsets have limited or no user interface to facilitate implementation of new features.

In alternative embodiments, the user may disconnect the home wiring from the PSTN network and drive the home wiring from the FXS port of the ATA. This alternative, however, does not work for users who receive their broadband service via a digital subscriber line (DSL) since a connection to the PSTN infrastructure is required to deliver the DSL service to the residence. Physically disconnecting the home wiring from the PSTN wiring of the local phone carrier also requires a level of technical skill and knowledge that is not common among typical users.

A further limitation of most VoIP services is that connecting multiple simultaneous calls into or out of the residence requires multiple ATAs with separate phone numbers and separate phones or phone systems (e.g., the cordless phone system). This limits flexibility for the user who may have multiple people living in a residence who may wish to hold a plurality of phone conversations at the same time.

Where multiple phones are served by a single ATA, the user is limited to placing or receiving a single phone call at any one time. In a residence where a plurality of people may need to use the phone, this limitation can lead to significant inconvenience. Therefore, a need exists in industry to address some of the aforementioned deficiencies and inadequacies.

SUMMARY OF THE INVENTION

An exemplary system and method for providing virtual multiple lines in a communication system is provided. The exemplary system allows a plurality of simultaneous communications (e.g., phone calls) to be conducted via a single access identifier (e.g., phone number). In exemplary embodiments, the system comprises a hub configured to route communications via PSTN and VoIP. The determination as to how the communication should be routed may be performed by the hub, a call services server, or a combination of both. At least one client device may be coupled in communication with the hub and configured to enable placement or receipt of a second or subsequent communication when a first communication is active. The client device is coupled to a communication device which places or receives the second or subsequent communication.

In exemplary embodiments, a first communication is established. Subsequently, an indication of a second communication is received. In some embodiments, the indication may comprise an access identifier (e.g., phone number) that is provided for initiating an outbound communication. In other embodiments, the indication may comprise notification of an inbound communication.

Routing information for the first communication is then determined. In some embodiments, the routing information may comprise whether the first communication is being routed through PSTN or a packet switched network. In other embodiments, the routing information may comprise which one or more devices within a local area network is active on the first communication.

Based on the routing information, the second communication may be routed accordingly. For example, if the second communication is an outbound communication and the first communication is being routed via the PSTN, then the second communication may be routed via the packet switched network. In another example, if the second communication is an inbound communication, then the second communication may be routed to one or more of the devices that are not active on the first communication.

DETAILED DESCRIPTION OF EXEMPLARY EMBODIMENTS

Embodiments of the present invention provide systems and methods for delivering advanced packet switching technology (e.g., VoIP) services to a plurality of communication devices (e.g., telephones) in a home or small office environment while simultaneously allowing multiple communications in the environment. In exemplary embodiments, the environment may have multiple access identifies, and multiple active communication channels can be associated with each access identifier associated with the environment. In one embodiment an access identifier associated with the environment may be the phone number of a PSTN line connected to the system. In this embodiment multiple active communications may be associated with the phone number of a PSTN line in the environment with the advantage of not having to install additional PSTN lines from the PSTN provider. Advantageously, embodiments of the present invention allow the use of existing, traditional communication devices in the environment and do not require multiplexing wiring in the environment. In further embodiments, the systems and methods may be extended to enable delivery of multiple media/communication types (e.g., voice, music, video, data) while maintaining quality of service, security, and extensibility through a managed network. Although examples are provided that discuss VoIP services and networks, those skilled in the art will appreciate that any packet switching technology may be used. For simplicity, the following description provides embodiments whereby the communication is a voice call. However, exemplary embodiments may be practiced with any communication types.

Figure 1:
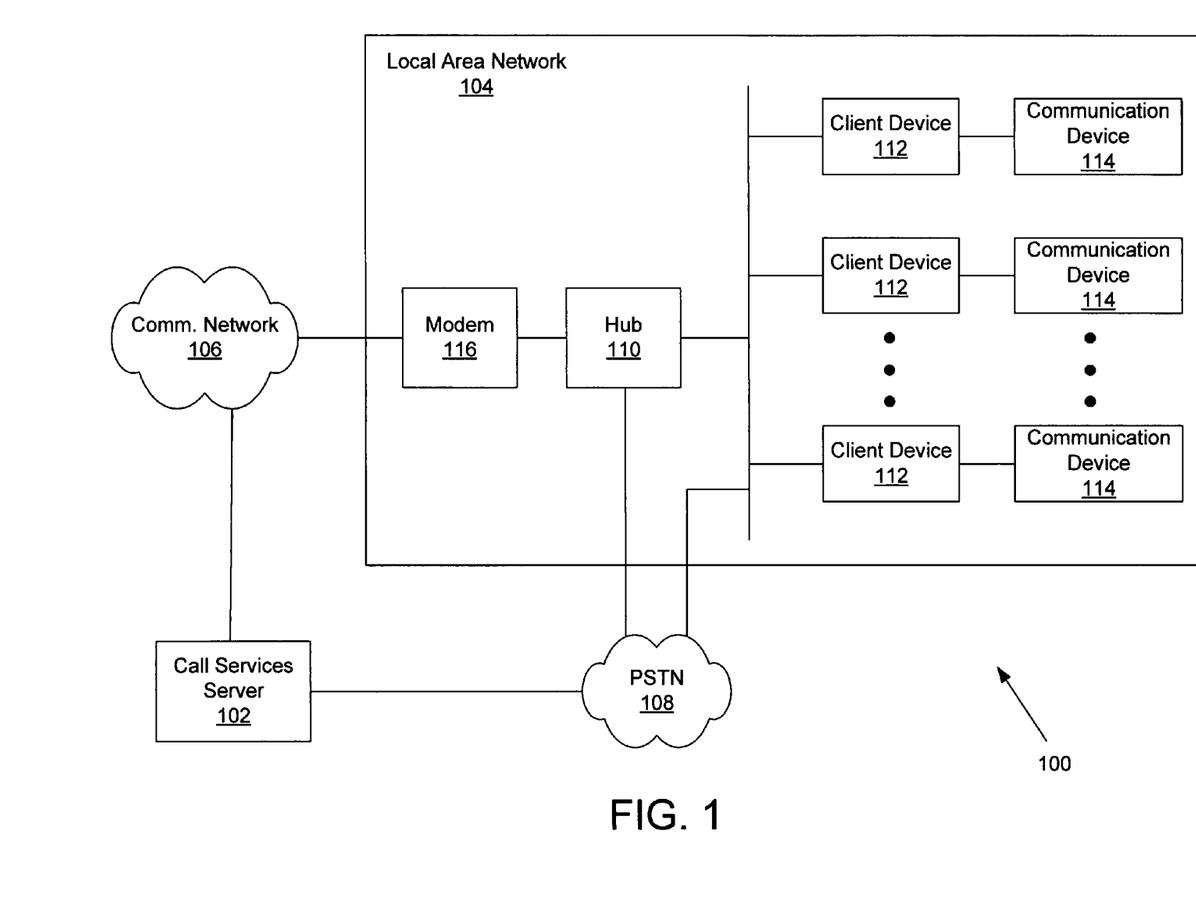
FIG. 1 is a block diagram of an exemplary communications environment in which embodiments of the present invention may be practiced.

FIG. 1 illustrates an exemplary communication environment 100 in which embodiments of the present invention may be practiced. The exemplary communication environment 100 comprises a call services server 102 coupled to a local area network (LAN) 104 via a communication network 106. The communication network 106 may comprise the Internet, a private network connected to the Internet, or any wide area network (WAN). In one embodiment, the communication network 106 uses an Ethernet protocol (IEEE 802.3). The call services server 102 may also be coupled to the LAN 104 via the PSTN 108.

In exemplary embodiments, a hub 110 provides a local area network connection to one or more client devices 112. In exemplary embodiments, the hub 110 comprises a specialized analog telephone adapter (ATA) or network device. The hub 110 and client devices 112 can each provide FXS channels for locally connected communication devices 114. In exemplary embodiments, the communication devices 114 may comprise telephones, answering machines, cordless phones, fax machines, modems, SIP phones, DECT handsets, or other communication equipment.

In exemplary embodiments, the hub 110 communicates with the client devices 112 via the Home Phone Network Alliance (HPNA). HPNA may be used to implement a high-speed network over the user's phone line that does not interfere with voice or DSL network traffic which may also exist on the phone wiring. HPNA is a digital packet protocol that is used to carry signaling and media packet between the hub 110 and the client devices 112. WiFi, DECT or other local area network technologies may also be used in place of HPNA. In some embodiments, the client device 112 and communication device 114 may be integrated into a single device such as a DECT handset. The client device 112 will be discussed in more detail in connection with FIG. 4 below.

The exemplary hub 110 may also be coupled to other devices in the LAN 104. The hub 110 may be coupled to the communication network 106 via a modem 116 (e.g., cable modem or DSL modem). Additionally, the hub 110 may be coupled to a router (not shown) for general purpose data networking within the LAN 104. It should be noted that, in exemplary embodiments, each hub 110 and LAN 104 may be associated with any number of access identifiers and may establish multiple communication sessions on each access identifier associated with the environment 100. As such, the hub 110 may act as a router of information between a broadband connection, the LAN connection used to serve telephony and media information to the client devices 112, as well as other networked devices in the LAN 104 possibly coupled through other LAN connections. The hub 110 will be discussed in more detail in connection with FIG. 2.

In exemplary embodiments, the hub 110 communicates via a WAN port to an ITSP network infrastructure. This ITSP network infrastructure may comprise one or more servers (e.g., call services server 102) that provide management functions for the hub 110, such as provisioning, registration, authorization, reporting, and software updates. These servers may also manage routing of calls. In the present embodiment, the call services server 102 is configured to perform some or all of these functions. However, any number of servers may perform these functions. In some embodiments, the ITSP network infrastructure may also comprise a PSTN-to-VoIP origination gateway device for handling calls coming from the PSTN to subscribers and/or a VoIP-to-PSTN termination gateway device to deliver calls from subscribers to PSTN phone numbers.

According to exemplary embodiments, the PSTN 108 is provisioned to "call forward on busy" to the call services server 102 (e.g., the ITSP origination gateway) for incoming calls. Thus, when the PSTN line is occupied by a telephone call, a second incoming call may be forwarded to the call services server 102 where it can be routed through a network connection (e.g., via the communication network 106) to the hub 110. The hub 110 may then notify unoccupied client devices 112 (and in some cases, notify occupied client devices 112) in the LAN 104 to ring (or provide call waiting indications) via their respective FXS ports. Any combination of incoming and outgoing calls routed through VoIP and PSTN 108 can be handled in this manner to transparently give users the ability to place and receive multiple simultaneous calls. If no lines are available for an incoming call (e.g., all telephones are on existing calls), then the call may be forwarded to voicemail, for example.

One skilled in the art will recognize that the exact configuration of the ITSP network infrastructure may differ from system to system. However, the basic functions of managing the network, routing calls, receiving PSTN calls intended for subscribers, and terminating calls from subscribers to external phone numbers on the PSTN will be provided.

The hub 110 may optionally be coupled to a land-line interface through a foreign exchange office (FXO) port to carry calls through the Public Switched Telephone Network (PSTN) 108 to a PSTN device (not shown). The PSTN 108 may comprise any level of the global PSTN (e.g., local transport network, regional transport network, international transport network). Alternatively, calls may be routed to the PSTN device via the communication network 106 using session initiation protocol (SIP) through an Internet telephony service provider (ITSP) which couples the call through a PSTN connection to the PSTN device.

In some embodiments, the LAN 104 may not be coupled to the PSTN 108. In these embodiments, all calls are made using VoIP over the communication network 106.

In exemplary embodiments, calls will be made via the PSTN 108 in certain situations regardless of whether the call is a long distance call. For example, if power is lost or the broadband connection is lost, VoIP functionality will be lost. In these situations, the calls may be hard wired to the PSTN 108 as default. In a further embodiment, the call may be a 911 call, which is automatically routed through the PSTN 108. In this embodiment, an established first call conducted over PSTN 108 may be disconnected in order to allow the 911 call to be made. Alternatively, an incoming or outgoing call that is not established (e.g., not connected between two parties) initially being conducted over PSTN 108 may be rerouted to through the communication network 106 in order to allow the 911 call to be conducted over the PSTN 108.

Figure 2:
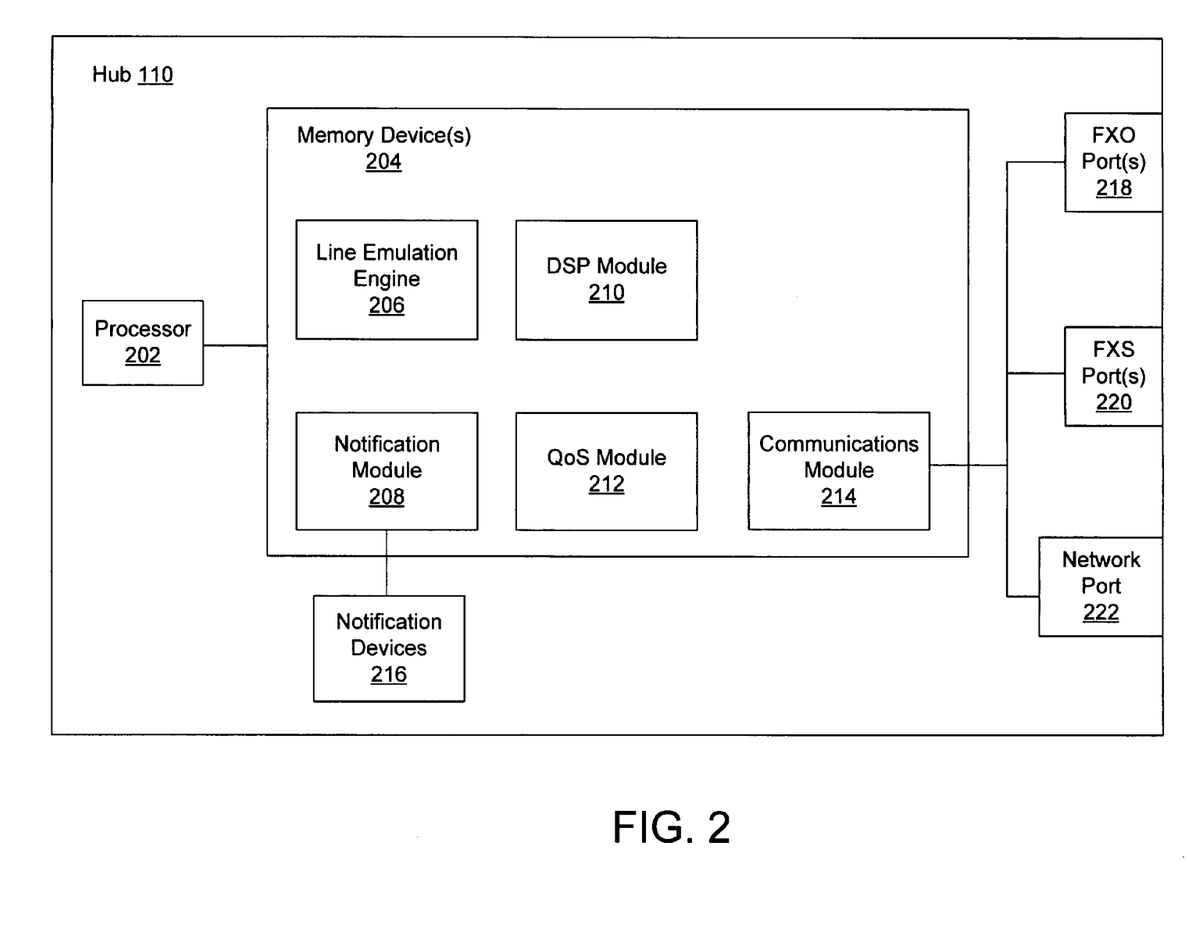
FIG. 2 is a block diagram of an exemplary hub.

Referring now to FIG. 2, the exemplary hub 110 is shown in more detail. In exemplary embodiments, the hub 110 comprises a processor 202 coupled to one or more memory devices 204. In some embodiments, the processor 202 may be configured to perform audio compression and decompression, echo cancellation, and audio mixing. The memory device 204 may comprise storage for a plurality of applications, components, and modules. In the present embodiment, the memory device 204 comprises a line emulation engine 206, notification module 208, digital signal processing (DSP) module 210, quality of service (QoS) module 212, and a communication module 214. Alternative embodiments may comprise more, less, or other engines and modules. For example, the DSP module 210 and QoS module 212 may be optional or be provided elsewhere in the environment 100. In one embodiment, the hub 110 comprises a personal computing device (e.g., a computer, a laptop, etc.).

The exemplary line emulation engine 206 is configured to provide virtual multiple communication lines to the local area network 104. The line emulation engine 206 will be discussed in more detail in connection with FIG. 3 below.

The notification module 208 is configured to function in connection with notification devices 216 of the hub 110. In some embodiments, the hub 110 may comprise notification devices 216, such as lights, buttons, speakers, microphones, and/or other user interfaces useful for delivering service as will be described herein.

The exemplary DSP module 210 is configured to provide digital signal processing of various data that is transported through the hub 110. In exemplary embodiments, the DSP module 210 may implement functions, such as audio compression and decompression, echo cancellation, and audio mixing, which may, in some embodiments, be required to deliver the VoIP services.

The exemplary QoS module 212 is configured to enforce quality of service. In some embodiments, quality of service functionality ensures that real-time media such as telephony is prioritized higher than non-real time traffic. This quality of service may maximize quality of VoIP phone calls carried in the LAN 104.

The exemplary communications module 214 may perform functions as directed by instructions from the line emulation engine 206. In exemplary embodiments, the communications module 214 may allow a second call to be made to or from one or more designated communication devices 114 as will be discussed further below.

The hub 110 may comprise other hardware components that enable the functionality of the hub 110. These exemplary components may comprise one or more FXO ports 218, FXS ports 220, and network ports 222. The FXO port 218 is configured to interface to the PSTN 108, while the FXS port 220 is configured to interface to the communication device 114 (e.g., analog phone) which may be directly connected to the hub 110. The network port 222 may provide a WAN (e.g., Ethernet) interface to the communication network 108 via the modem 116. Another network port 222 may be optionally provided for a local area (LAN) interface to, for example, a personal computing device, and/or router. In some embodiments, the network ports 222 may comprise RJ-45 connectors or ports.

As discussed, the hub 110 may be coupled to the PSTN 108 via the FXO port 218, which allows the hub 110 to route calls directly to the PSTN 108 in addition to routing VoIP calls via the communication network 106. As such, the hub 110 interconnects a local phone company, in-house wiring, and VoIP network(s). As a result, one or more alternative telephony channels may be created using the existing in-house/PSTN wiring, which enables conventional telephones to communicate with the hub 110 (via the client devices 112) independently of baseband calls by the hub 110 via the PSTN 108. Any type of LAN can provide the required separation between a baseband call and a simultaneous VoIP call.

In some embodiments, the communication device 114 may be directly coupled to the hub 110 via the FXS port 218 of the hub 110. In these embodiments, the hub 110 performs functionalities of the client devices 112, which will be described further below.

In one embodiment, the hub 110 communicates with one or more client devices 112 through an HPNA network established on a user's twisted pair telephone wiring. Alternatively, any network technology adequate to carry streamed media, such as voice, can be used for communication between the hub 110 and the client devices 112. For example, the hub 110 and the client devices 112 can communicate (e.g., via the communications module 214) using IP networking over AC wiring (e.g., HomePlug) or over a wireless network (e.g., DECT, 802.11b or 802.11g).

Figure 3:
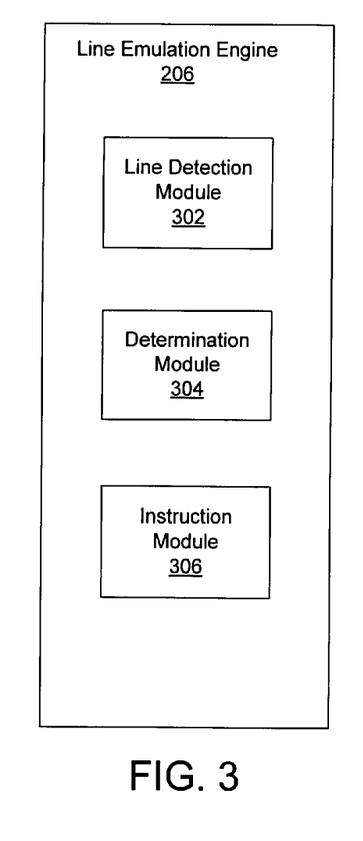
FIG. 3 is a block diagram of a line emulation engine in accordance with exemplary embodiments.

Referring now to FIG. 3, the exemplary line emulation engine 206 is shown in more detail. The line emulation engine 206 is configured to provide virtual multiple communication lines to a single local environment (e.g., LAN 104). In exemplary embodiments, the line emulation engine 206 may comprise a line detection module 302, determination module 304, and instruction module 306.

In exemplary embodiments, the line detection module 302 is configured to detect call activities within the LAN 104. Thus, the line detection module 302 will detect if one or more calls are active. The line detection module 302 may also identify how calls are being routed. For example, the line detection module 302 may detect that a first call is being sent via PSTN and a second call is routed through the communication network 106 via VoIP. In a further example, the line detection module 302 may determine which devices (e.g., client device 112, communication device 114) are active on calls.

The exemplary determination module 304 is configured to determine how to provide one or more additional calls. For example, if a first call is actively being routed through PSTN 108, then the determination module 304 may decide to route a second call via the communication network 106, and vice versa. In a further embodiment, the determination module 304 may route a 911 call via PSTN 108. As such, the determination module 304 determines optimal routing available for a call. In an alternative embodiment, the call services server 102 may determine the optimal routing.

The determination performed by the determination module 304 (or call services server 102) may be made based on predetermined policies or libraries. Thus, the route choice may be based on originating and destination location, carrier cost, carrier availability, and whether the destination is to another call services subscriber. For example, if the call is a local call, then the call may be routed via PSTN 108. In contrast, a long distance call may be routed via VoIP. In another example, the call is routed via VoIP if the PSTN line is busy. The hub 110 may then route the call over, for example, the PSTN line coupled to the hub 110 (if it exists and is available), via the communication network 106 to the target telephone number (e.g., if the telephone number is with a cooperating VoIP subscriber), or to a termination gateway where the call may be forwarded through the PSTN 108 to the target phone number. In some embodiments, more than one route may be determined to give the hub 110 several routes in case one is not available.

The instruction module 306 is configured to generate routing instructions. In some embodiments the instructions are based on the determination performed by the determination module 304. These routing instructions may be provided to the communications module 214, which activates the appropriate port(s) (e.g., FXO port 218, FXS port 220, network port 222) for routing of one or more inbound or outbound calls.

Figure 4:
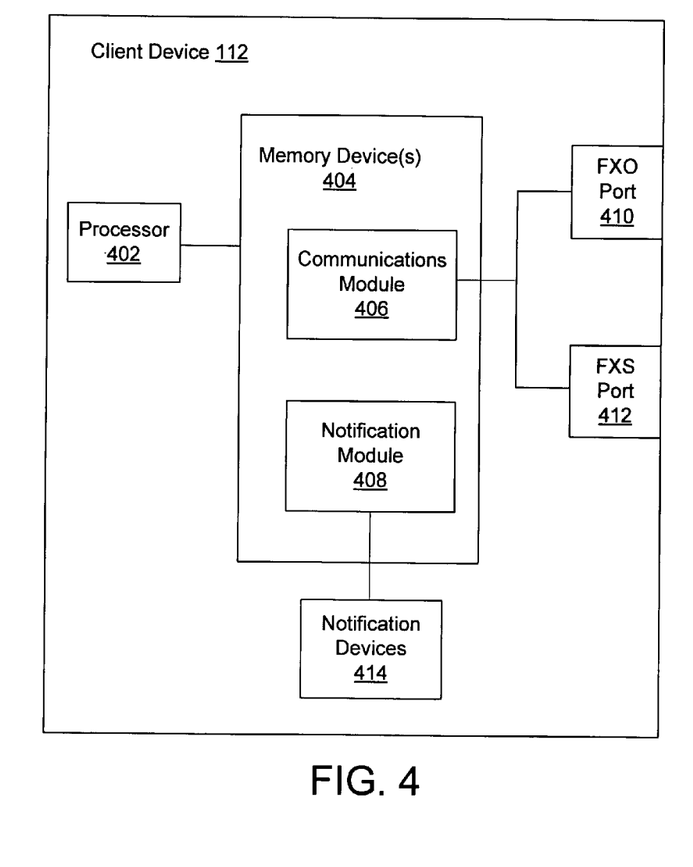
FIG. 4 is a block diagram of an exemplary client device.

Referring now to FIG. 4, the exemplary client device 112 is shown in more detail. In exemplary embodiments, the client device 112 comprises a remote station which extends one or more features to one or more coupled communication devices 114 (e.g., analog telephones) in order to provide communication via packet switching technology, PSTN, or basic SIP.

In exemplary embodiments, the client device 112 comprises a processor 402 coupled to one or more memory devices 404. The memory device 404 may comprise storage for a plurality of applications, components, and modules. In the present embodiment, the memory device 404 comprises, at least, a communications module 406, and a notification module 408. In exemplary embodiments, the client device 112 may be coupled in communication with the hub 110 via a FXO port 410. In some embodiments, the client device 112 provides baseband fallback in case of power failure.

The communication module 406 of the client device 112 is configured to activate one or more FXS port(s) 412. As discussed above, the client device 112 is coupled via the FXS port 412 to the communication device 114 in order to communicatively couple the communication device 114 (e.g., a standard telephone) to the hub 110. In the present embodiment, the client device 112 communicates with the hub 110 over HPNA or similar network technology. In a call scenario, a user goes off-hook on one of the communication devices 114 coupled to the client device 112 (or hub 110 if the hub 110 incorporates the FXS port 220 and is connected to the communication device 114). The communication device 114 is coupled through the FXS port 412 where audio is digitized and passed (along with DTMF tones generated by the communication device 114) to the hub 110. Alternatively, the audio may be compressed at the client device 112 before being passed to the hub 110. Typically, the user enters a desired phone number or other access identifier which may be passed as DTMF tones to the FXS port 412, which then passes the information to the hub 110 over the LAN 104 (e.g., via HPNA).

The notification module 408 is configured to function in connection with notification devices 414 located at the client device 112. In some embodiments, the client device 112 may comprise notification devices 414, such as lights, buttons, speakers, microphones, and/or other user interfaces useful to delivering service as will be described herein.

According to exemplary embodiments, the notification devices 216 and 414 of the hub 110 and client device 112, respectively, comprise a number pad. Each number button of the number pad may comprise a light. If the light is solid, for example, then a call is active on that line (e.g., number button "1" is solidly lit, so line 1 is active on a call) at that hub 110 or client device 112. If the number button is blinking, then a call is on hold for that hub 110 or client device 112. Alternatively, a blinking number may indicate that a call is active, but not at the local hub 110 or client device 112 that comprises the blinking number. An unlit number button may signify that the line is not active. One skilled in the art will appreciate that any combination of light functions and call status may be used.

In some embodiments, calls may be manipulated at the hub 110 or client device 112 using the number pad. For example, if a user desires to join an existing call, the user may press a blinking number associated with the existing call to join the call and use the coupled communication device 114 to communicate. Conversely, the user may leave an existing call my pressing the number associated with the call line, pressing a flash button, or pressing another call ending button on the client device or hub.

According to some embodiments, if a user wants to conference two existing calls (i.e., on two separate lines), the user may simultaneously press the number buttons of the two lines on which the two calls are being conducted to conference the two calls together. In alternative embodiments, a conference selection or other buttons/selections may be provided to conference the two calls together. Subsequently, in order to un-conference these two calls, one of the users in the LAN 104 may, in one embodiment, press one of the two number buttons representing the conference lines and the user will remain on the selected line corresponding to the pressed number button. The other line will continue with the other user in the LAN 104. Although two existing calls are discussed, it will be appreciated by those skilled in the art that any number of existing calls may be placed in conference. Similarly, any number of calls may be separated from the conference (i.e., to un-conference the calls).

In some embodiments, the notification devices 216 and 414 may comprise a sound generator or speaker. For example, if a call ends at the hub 110 or client device 112 and another call is on hold, the hub 110 or client device 112 may ring or provide other audio signal to indicate a held call. The audio signal may be provided along or in addition to visual signals (e.g., lit button on the number pad). Any type of audio signal (e.g., rings, tones, verbal cues) may be provided for any type of call status or situation (e.g., incoming call, termination of call, call waiting). In one embodiment, an audio or visual cue may be provided to indicate if a call is being routed through the communication network 106 (e.g., via VoIP) or the PSTN 108.

If a second communication device 114 in the LAN 104 is then taken off-hook while the first call is in progress, a second caller may hear a distinctive dial tone (e.g., instead of the familiar behavior of a circuit switched network of being placed on a 3-way party line with the first call). In one instance, the second caller may press a button on the client device 112 (or perform some other action) to be joined with the first call. The second call may also enter a new phone number to establish a second call. In some embodiments, this second call may be routed through a broadband connection (via the communication network 106) if the first call is via PSTN 108. Additional calls can be made via the broadband connection up to the limits of the broadband capacity of the subscriber's LAN 104. As a result, multiple simultaneous phone calls may be maintained through a single hub 110, thus eliminating problems normally associated with having a single phone line.

Incoming calls may function in a similar manner. The incoming call may arrive via either a PSTN line or an origination gateway from the ITSP network infrastructure. The incoming call may cause the hub 110 to signal each client device 112, not occupied with a call, to ring the coupled communication device 114 through their respective FXS ports 412. The call is completed when a user goes off-hook on any communication devices 114 coupled to an unoccupied client device 112. In some embodiments, if a second call is received at the LAN 104, the hub 110 can direct occupied client devices 112 to provide a call waiting indicator, while ringing may be provided by unoccupied client devices 112.

In other embodiments, the incoming call may cause the hub 110 to signal a subset of client devices 112. In some examples, the hub 110 may select client devices 112 based on caller ID, called number or time-of-day. As a result, only one or a few client devices 112 out of a set may be signaled by the hub 110. In exemplary embodiments, this determination may be performed by the determination module 304 of the hub 110.

It should be noted that the hub 110 and the client devices 112 may comprise different embodiments or forms. Some hubs 110 and client devices 112 may interact with the user using lights and buttons. Other embodiments may incorporate LCD displays, touch screens, touch pads, voice recognition, or other means for providing user information and control. Some hubs 110 may integrate a base station function for a cordless telephone system. Additionally, the hub 110 and client devices 112 are not limited to carrying voice. The hub 110 and client devices 112 may be configured to carry music, video, or other streamed media, for example.

Figure 5:
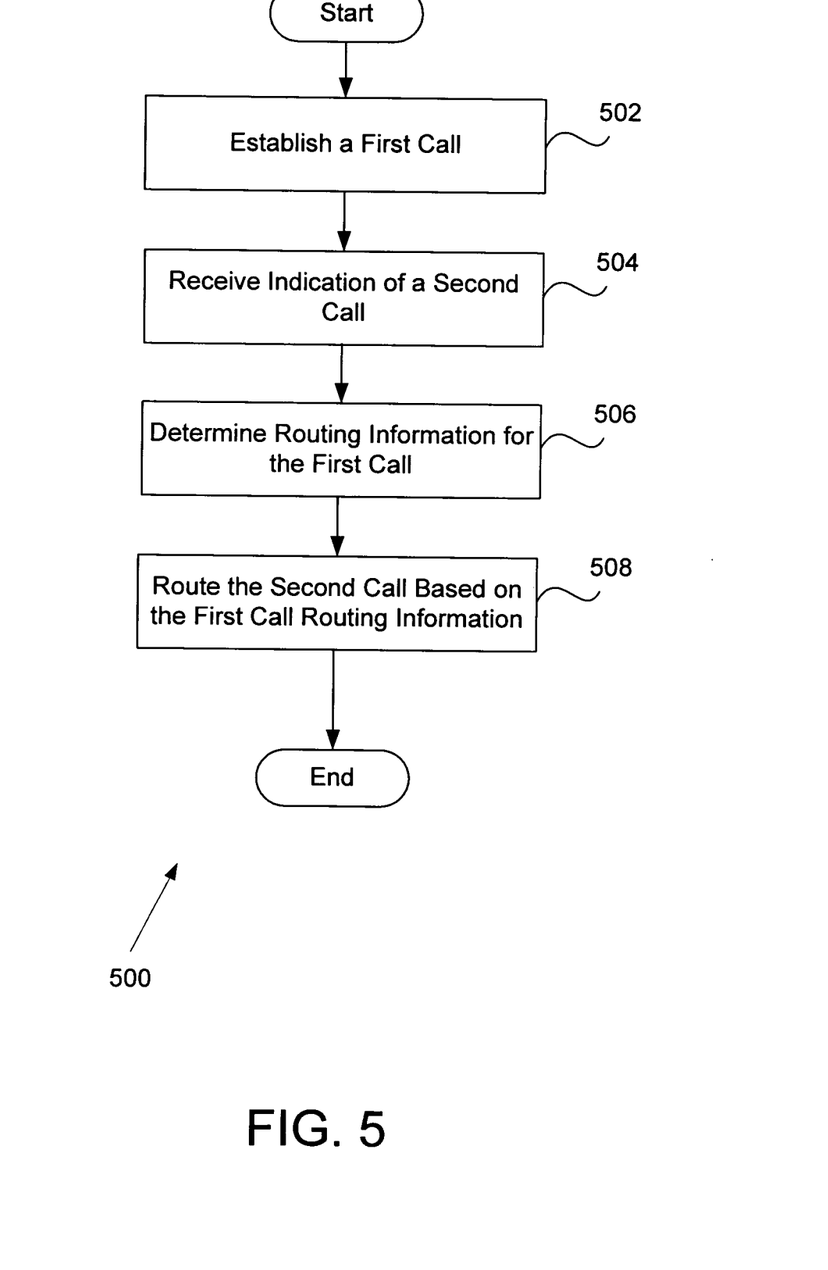
FIG. 5 is a flowchart of an exemplary method for providing virtual, multiple lines in a VoIP system.

Referring now to FIG. 5, a flowchart 500 of an exemplary method for providing multiple lines of communication is provided. In step 502, a first call is established. The first call may comprise an inbound call or an outbound call. Typically, one or more of the client devices 112 and communication devices 114 will be active on the first call.

In step 504, an indication of a second call is received. For an outbound communication, the indication may comprise an access identifier (e.g., phone number) that is provided for initiating the outbound communication. For an inbound communication, the indication may comprise notification of an inbound communication.

Routing information for the first communication is then determined in step 506. Based on the routing information, the second communication may be routed accordingly in step 508. Steps 506 and 508 will be discussed in more detail in connection with FIG. 6 and FIG. 7.

Figure 6:
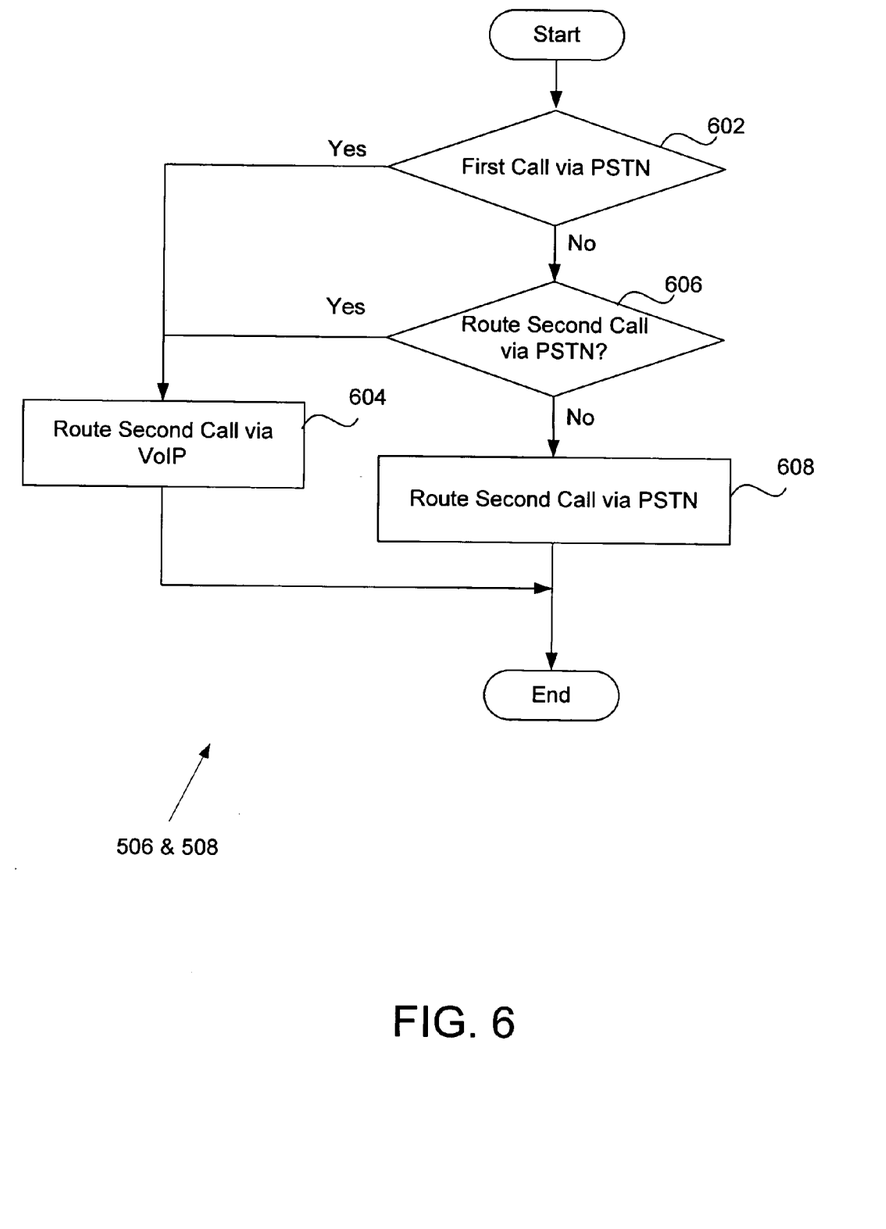
FIG. 6 is a flowchart of an exemplary method for providing an outbound communication via a second line.

FIG. 6 is a flowchart for determining routing information for a first call and routing the second call when the second call is an outbound call. In step 602, a determination is made as to whether the first call is being conduct over the PSTN 108. As typically only one call may be carried over the PSTN 108, if the first call is a PSTN call, then the outbound second call will be routed using VoIP (e.g., over the packet switched communication network 106) in step 604.

If the first call is not being routed over the PSTN 108, then in step 606, a determination is made as to whether the second call should be routed using the PSTN 108 or VoIP. In exemplary embodiments, the determination is performed by the determination module 304 (or a determination module at the call services server 102) may be made based on predetermined policies or libraries. Thus, the route choice may be based on, for example, originating and destination location, carrier cost, carrier availability, available quality of service, the capacity to carry high bandwidth audio, and whether the destination is to another call services subscriber. For example, if the call is a local call, then the call may be routed via PSTN 108. In contrast, a long distance call may be routed via VoIP. Based on this determination, the second call may be routed via the PSTN in step 608 or using VoIP in step 604.

Figure 7:
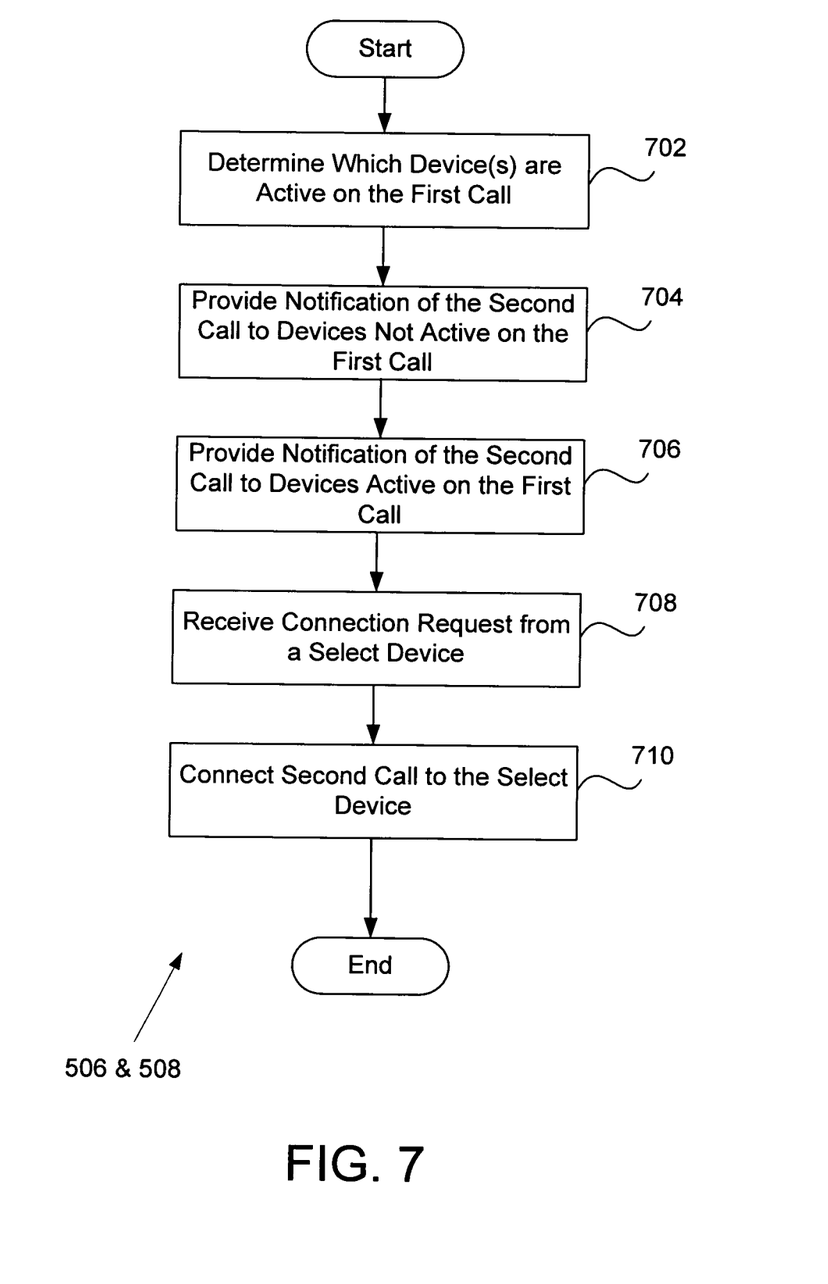
FIG. 7 is a flowchart of an exemplary method for providing an inbound communication via a second line.

FIG. 7 is a flowchart for determining routing information for a first call and routing the second call when the second call is an inbound communication. In step 702, a determination is made as to which device(s) are active on the first call. In exemplary embodiments, the line detection module 302 determines which client device 112 and communication device 114 is active on the first call.

In step 704, notification of the inbound second call is provided to devices not active on the first call. These devices (e.g., client device 112, communication device 114) may then provide audio and/or visual signals to indicate the inbound second call.

In optional step 706, notification may be provided to devices active on the first call. In exemplary embodiments, the notification may comprise a "call waiting" indication that is provided audibly, visually, or both. It should be noted that steps 704 and 706 may be practiced simultaneously.

In step 708, a connection request is received from a select device. For example, a particular communication device 114 may go off-hook (e.g., handset is picked up) thus triggering a request to answer the second call. In another example, a user at a device active on the first call may answer the second call by pressing a button which simultaneous places the first call on hold and requests to answer the second call. The second call is then connected in step 710.

The above-described functions and components can be comprised of instructions that are stored on a computer readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and computer readable storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for providing multiple communication lines using a single access identifier associated with a location, comprising:
    establishing a first communication using a hub, the first communication being a first voice call originated or received by a first user at the location via the single access identifier, the hub being disposed at the location, the hub integrating a DECT cordless telephone base station, the first user using a DECT communications device, the DECT communications device being wirelessly coupled to the DECT cordless telephone base station;
    receiving an indication of a second communication;
    determining routing information for the first communication;
    routing the second communication based at least in part on the routing information of the first communication, the second communication being a second voice call originated or received by a second user at the location via the single access identifier, the second user using a communications device, the communications device being coupled to the hub through at least one of the DECT cordless telephone base station, a Foreign eXchange Subscriber (FXS) port, and an IP network; and
    receiving a selection for separating a conferenced plurality of communications into a plurality of communication lines, and separating the conferenced plurality of communications into two or more separate communications.

2. The method of claim 1 wherein if the routing information of the first communication indicates the first communication is established via PSTN, routing the second communication via a packet switching network.

3. The method of claim 2 wherein the packet switching network is the Internet.

4. The method of claim 2 wherein the packet switching network is a private network connected to the Internet.

5. The method of claim 2 wherein the packet switching network uses an Ethernet protocol IEEE 802.3.

6. The method of claim 1 wherein if the routing information of the first communication indicates the first communication is not established via PSTN, determining if the second communication should be established via PSTN or a packet switching network, and establishing the second communication accordingly.

7. The method of claim 1 wherein the indication is a DTMF sequence of a target access identifier.

8. The method of claim 1 wherein the indication is a call forward on busy from the PSTN provider.

9. The method of claim 1 wherein the determining routing information comprises determining which one or more devices within the location is active on the first communication.

10. The method of claim 9 further comprising providing notifications to one or more devices not active on the first communication to indicate the second communication when the second communication is an incoming communication.

11. The method of claim 9 further comprising providing a call waiting indication at the one or more devices active with the first communication to indicate the second communication when the second communication is an incoming communication.

12. The method of claim 1 further comprising automatically routing the second communication using PSTN when access to a packet switching network is unavailable.

13. The method of claim 1 further comprising providing one or more notifications to a user with status of active communications within the location.

14. The method of claim 1 further comprising receiving a selection for conferencing two or more communications on a plurality of separate communication lines, and conferencing the two or more communications.

15. The method of claim 1 further comprising automatically using PSTN when the first or second communication is a 911 call.

16. A system for providing multiple communication lines via a single access identifier associated with a location, comprising:
    a line detection module configured to detect status and routing information for an established first communication, the first communication being a first voice call originated or received by a first user at the location via the single access identifier, the first communication using a hub, the hub being disposed at the location, the hub integrating a DECT cordless telephone base station, the first user using a DECT communications device, the DECT communications device being wirelessly coupled to the DECT cordless telephone base station;
    a determination module configured to determine how to route a second communication based at least in part on the routing information for the established first communication, the second communication being a second voice call originated or received by a second user at the location via the single access identifier; and
    an instruction module configured to generate instructions for routing the second communication based on the determination, the second communication being a second voice call originated or received by a second user at the location via the single access identifier, the second user using a communications device, the communications device being coupled to the hub through at least one of the DECT cordless telephone base station, a Foreign eXchange Subscriber (FXS) port, and an IP network, and for receiving a selection for separating a conferenced plurality of communications into a plurality of communication lines and separating the conferenced plurality of communications into two or more separate communications.

17. The system of claim 16 further comprising a notification device configured to provide notification status for at least the first communication.

18. The system of claim 16 further comprising a notification device configured to receive a request to combine or separate a plurality of communications.

19. The system of claim 16 further comprising an FXO port configured to provide routing via PSTN.

20. The system of claim 16 further comprising a network port configured to provide routing via a packet switched network.

21. The system of claim 16 further comprising at least one call services server, wherein the determination module is located at the call services server.

22. A non-transitory machine readable medium having embodied thereon a program, the program comprising instructions for a method for providing multiple communication lines using a single access identifier associated with a location, the method comprising:

establishing a first communication using a hub, the first communication being a first voice call originated or received by a first user at the location via the single access identifier, the hub being disposed at the location, the hub integrating a DECT cordless telephone base station, the first user using a DECT communications device, the DECT communications device being wirelessly coupled to the DECT cordless telephone base station;

receiving an indication of a second communication, the second communication being a second voice call originated or received by a second user at the location via the single access identifier;

determining routing information for the first communication;

routing the second communication based, at least, on the routing information of the first communication, the second communication being a second voice call originated or received by a second user at the location via the single access identifier, the second user using a communications device, the communications device being coupled to the hub through at least one of the DECT cordless telephone base station, a Foreign eXchange Subscriber (FXS) port, and an IP network; and receiving a selection for separating a conferenced plurality of communications into a plurality of communication lines, and separating the conferenced plurality of communications into two or more separate communications.

\* \* \* \* \*